US010929964B2

United States Patent
Kuchino

(10) Patent No.: US 10,929,964 B2
(45) Date of Patent: Feb. 23, 2021

(54) SYSTEM AND METHOD FOR PERFORMING LOCAL-AREA CONTRAST ENHANCEMENT OF DIGITAL IMAGES

(71) Applicant: Synaptive Medical (Barbados) Inc., Bridgetown (BB)

(72) Inventor: Piotr Kuchino, Toronto (CA)

(73) Assignee: SYNAPTIVE MEDICAL INC., Toronto (CA)

(*) Notice: Subject to any disclaimer, the term of this patent is extended or adjusted under 35 U.S.C. 154(b) by 0 days.

(21) Appl. No.: 16/279,593

(22) Filed: Feb. 19, 2019

(65) Prior Publication Data
US 2019/0287227 A1 Sep. 19, 2019

(30) Foreign Application Priority Data
Feb. 20, 2018 (CA) .................. CA 2995708

(51) Int. Cl.
G06K 9/40 (2006.01)
G06T 5/00 (2006.01)
G06T 5/20 (2006.01)
G06T 5/40 (2006.01)

(52) U.S. Cl.
CPC .............. G06T 5/008 (2013.01); G06T 5/20 (2013.01); G06T 5/40 (2013.01); G06T 2207/20024 (2013.01)

(58) Field of Classification Search
CPC .. G06T 5/008; G06T 5/20; G06T 5/40; G06T 2207/20024
USPC ........................................ 382/264
See application file for complete search history.

(56) References Cited

U.S. PATENT DOCUMENTS

| | | | |
|---|---|---|---|
| 6,580,825 B2 | 6/2003 | Bhaskar | |
| 8,565,549 B2 | 10/2013 | Leitao | |
| 2002/0081022 A1* | 6/2002 | Bhaskar | ............... H04N 1/4074 382/162 |
| 2002/0167615 A1* | 11/2002 | Spitzer | ..................... G06T 5/20 348/679 |
| 2007/0183680 A1 | 8/2007 | Aguilar | |
| 2008/0002905 A1 | 1/2008 | Kuno | |

(Continued)

FOREIGN PATENT DOCUMENTS

| | | |
|---|---|---|
| CN | 10329591 B | 3/2016 |
| CN | 107657594 A | 2/2018 |
| WO | 2009/057106 A1 | 5/2007 |

OTHER PUBLICATIONS

Office Action issued by the Canadian Intellectual Property Office in relation to corresponding Canadian application No. 2,995,708, dated Dec. 6, 2018, 4 pgs.

(Continued)

*Primary Examiner* — Stephen P Coleman

(57) ABSTRACT

An improvement to an image processing system for enhancing the contrast of digital images using a local-area contrast enhancement of the digital images. For each digital image, a contrast factor is computed which is a measure of how well exposed the digital image is based on a normalized intensity value for each of the image pixels. A gain value for each of the image pixels is determined, and scaled by the contrast factor. A surround image based on a filtered version of the digital image is formed and using in conjunction with the scaled gain values to perform opponent contrast filtering to the digital image to produce an output image.

17 Claims, 6 Drawing Sheets

(56) References Cited

U.S. PATENT DOCUMENTS

2008/0240598 A1   10/2008  Hasegawa
2011/0123134 A1*  5/2011  Leitao .................. H04N 1/4092
                                                        382/274
2017/0309441 A1*  10/2017  Flanagan, IV ........ H01J 37/265
2018/0012339 A1   1/2018  Puetter et al.

OTHER PUBLICATIONS

Search report issued by the Intellectual Property Office of the United Kingdom in relation to corresponding GB Application No. GB1902285.4 dated Aug. 15, 2019, 4 pgs.
Office Action issued by the Canadian Intellectual Property Office in relation to corresponding CA Application No. 2,995,708 dated Nov. 26, 2019, 6 pgs.

* cited by examiner

SYSTEM AND METHOD FOR PERFORMING LOCAL-AREA CONTRAST ENHANCEMENT OF DIGITAL IMAGES

FIELD OF THE INVENTION

The present invention relates generally to systems and methods for performing local-area contrast enhancement of digital images, and more particularly systems and methods for performing local-area contrast enhancement of digital images using opponent contrast filtering.

BACKGROUND OF THE INVENTION

Medical images contain a vast amount of information that can potentially be used to perform medical diagnoses. This information, although readily available, is often obscured within the image such that the medical practitioner interpreting the image cannot distinguish medically relevant features. Features or indicators that exist within a medical image may vary imperceptibly from their surroundings. However, with contrast enhancement, these features may become discernable and accordingly used to inform medical diagnoses and procedures.

Conventional contrast enhancement techniques often fail to adequately highlight medically relevant features within medical images. Features of interest often appear chromatically similar to other nearby features and are often obscured by shadows or otherwise inconsistent lighting. These features are not adequately enhanced using conventional techniques that operate on the image as a whole. Differences between the features of interest and their surroundings often represent a small proportion of the image's total dynamic range and conventional contrast enhancement algorithms typically adjust the image accordingly.

Local contrast enhancement improves on the conventional technique by adjusting portions of the image based on its immediate surroundings rather than the image as a whole. This allows for small differences that are significant locally but not globally, to be enhanced so that they become more apparent. This allows for features to become more prominent within their surroundings.

In medical imaging local area contrast enhancement is important in a variety of areas. Especially in narrow corridors or port procedures, it can be difficult or impossible to sufficiently illuminate the scene. Also, geometry can occlude the illumination, casting shadows. This is detrimental since clinically relevant information may be present in the shadowed/dark areas. Local area contrast enhancement can address this problem.

SUMMARY OF THE INVENTION

The invention provides an improvement to an image processing system. The image processing system includes a computer processor and a memory containing a digital image which contains an array of image pixels. The computer processor being configured to process the digital image. The improvement is the configuration of the computer processor to perform a local-area contrast enhancement of the digital image by a series of steps. The first step is to determine a contrast factor of the digital image. The contrast factor is a measure of how well exposed the digital image is based on a normalized intensity value for each of the image pixels. The second step is to determine a gain value for each of the image pixels in the digital image. The third step is to scale the gain value of each of the image pixels by the contrast factor. The fourth step is to calculate a surround image based on a filtered version of the digital image. The fifth step is to apply opponent contrast filtering to the digital image to produce an output image. The opponent contrast filtering is based on the scaled gain values and the surround image. The final step is to store the output image in the memory. Note that the above numbering of the steps is not intended constrain the order of the steps.

The surround image is preferably produced by applying a Gaussian filter to the digital image. Each image pixel, I, and output pixel, O, has one or more than one component values, $I_i$ and $O_i$ respectively, where i indexes the components. For each of the image pixels, $O_i$ may be calculated as $X_i/Y_i$, where $X_i$ is [the scaled gain value of the image pixel multiplied by $I_i$] less [the i'th component value of the corresponding pixel in the surround image] and $Y_i$ is the sum of (a) an attenuation factor, (b) the scaled gain value of the image pixel multiplied by $I_i$, and (c) the i'th component value of the corresponding pixel in the surround image. The attenuation factor may be 0. The number of component values for each pixel may be 3, and, for image pixel I, $I_1$ may be a red value, $I_2$ may be a green value and $I_3$ may be a blue value.

The contrast factor may be calculated by calculating the normalized intensity value for each of the image pixels, each normalized intensity value being a number in the range of 0 to 1. Then, a first cut-off value may be identified as the intensity value with N % of the intensity values of the image pixels being greater than or equal to the max tail value, and (100−N) % of the intensity values of the image pixels being less than the first cut-off value. N is a number between 1 and 20. Then, a max tail value may be calculated as the mean value of all the pixels with intensity values greater than or equal to the first cut-off value. Then, a second cut-off value may be identified as the intensity value with (100−N) % of the intensity values of the image pixels being greater than or equal to the min tail value, and N % of the intensity values of the image pixels being less than the min tail value. Then, a min tail value may be calculated as the mean value of all the pixels with intensity values less than the second cut-off value. Then, the contrast factor may be calculated as 1−(max tail value−min tail value). Each image pixel may have a red value, a green value and a blue value, each normalized to values in the range of 0 to 1. The normalized intensity value of each pixel is the maximum of the normalized red, green and blue values of the image pixel.

The gain values of the image pixels may be calculated by producing a provisional gain map by, for each image pixel, applying a sigmoid function to the normalized intensity value of the image pixel to calculate a provisional gain value of the provisional gain map, and applying an edge preserving blur filter to the provisional gain map to produce an image gain map having gain values corresponding to the image pixels. The gain value of each of the image pixels may be the gain value in the image gain map corresponding to the image pixel. The sigmoid function may be applied to each input image pixel value I to compute $$O = \frac{1}{1 + e^{-10(1-I)+7}}$$

The computer processor may also apply a mid-tone preservation step to adjust the scaled gain values before applying opponent contrast filtering to the digital image. The mid-tone preservation step may retain the ratios of the input tri-chromatic values and optionally adjust the output chroma.

Each output pixel value, O, corresponding to an input image pixel with value I, may be calculated as $$O = \frac{gI - s}{A + gI + s}$$

where g is the scaled gain value for the input image pixel, s is the pixel value in the surround image corresponding to the input image pixel, and A is an attenuation factor.

The invention also provides an image processing system for perform local-area contrast enhancement of digital images as described above.

The invention also provides a method to perform a local-area contrast enhancement of a digital image by a computer processor. In the method, a contrast factor of the digital image is determined, the contrast factor being a measure of how well exposed the digital image is based on a normalized intensity value for each of the image pixels. Then, a gain value is determined for each of the image pixels in the digital image. Then, the gain value of each of the image pixels is scaled by the contrast factor. Then, a surround image is calculated based on a filtered version of the digital image. Then, opponent contrast filtering is applied to the digital image to produce an output image. The opponent contrast filtering is based on the scaled gain values and the surround image. The output image is stored in a memory.

DETAILED DESCRIPTION OF THE INVENTION

The present disclosure describes a system and method for enhancing medical images by digital processing.

Figure 1:
FIG. 1 depicts a surgical camera video feed with and without image enhancement. The three images represent different levels of image enhancement. The leftmost image is in its original form and has not been enhanced in any way. The center image has been enhanced using local area contrast enhancement. This allows the highlights of the image to be preserved while detail in dark areas is substantially enhanced. Finally, the rightmost image has been enhanced using global area contrast enhancement. This enhancement modifies the entire image in a uniform way resulting in unrealistic colours.

The invention is a system and method for enhancing the contrast of an image or of a video stream based on its surroundings. The contrast enhancement algorithm boosts perceived contrast for localized features while preserving the realism of the image appearance after enhancement. This procedure may be performed in real-time, such as on a surgical camera video feed (FIG. 1) or more generally on images received from any imaging system. For example a feature, such as a cancerous tumor, may ordinarily appear as being indistinguishable from the background yet may appear as a highly contrasted region with the algorithm applied. This enhancement is accomplished by mapping pixel values from one portion of the colour space to new values within the same colour space where they are spread further apart.

The term "colour space" as used herein refers to a particular coordinate representation of points in a colour model. This space may be represented by 1 or more channels. The term "RGB colour space" as used herein means the Cartesian (cube) representation of an RGB colour model having orthogonal red, green and blue axes. An RGB colour space is represented by 3 channels: one for red; one for green; and one for blue.

A digital image is composed of pixels that are values in a colour space. For example, values provided by a camera for each pixel are typically represented by three numbers, such as three 8, 12 or 16 bit digital values, corresponding to the intensities of the red, green and blue channels in what will be referred to as the RGB colour space. The RGB colour space is widely employed for imaging and video equipment, such as cameras and displays.

The system receives an image or a sequence of images from a source device or system. Each image, or frame of video being multiple images indexed sequentially, is a rectangular array of pixels of one or more channels represented by a colour space. For example, each image may be a rectangular array of 1920 by 1080 pixels, where each pixel is a 24-bit value, eight bits specifying the intensity of the red channel, eight bits specifying the intensity of the green channel and eight bits specifying the intensity of the blue channel.

Within the image, features may be perceived to exist where groupings of co-located pixels have perceptibly similar values such that the feature pixel values differ significantly from surrounding pixel values. Features may be enhanced such that the difference between the feature pixel values and surrounding pixel values is increased.

The disclosed system employs local-area contrast enhancement such that features are enhanced based its surroundings. Unlike with a global contrast enhancement system, local-area contrast enhancement allows feature enhancement where pixel values of nearby features differ slightly such that the difference in pixel values between the two features represent a small proportion of the image's total dynamic range.

Local-area contrast enhancement algorithms have long been an area of research. Perhaps the most famous, Retinex—an algorithm based on human perception, is a commonly used algorithm in medical imaging. Other approaches for contrast enhancement have included multi-scale techniques, histogram equalization, and curvelet transforms. The disclosed system differs from the aforementioned approaches in several ways.

First, it favours a bio-mimetic approach to representing vision (it is loosely based on a one layer neural network).

Second, it is designed to be easily adapted to a streaming hardware based implementation, such as on a field-programmable gate array (FPGA), application-specific integrated circuit (ASIC), or graphics processing unit (GPU).

Third, it is targeted towards preserving a realistic appearance after enhancement in natural scenes.

Fourth, it is largely automatic, adapting enhancement parameters based on image content.

Fifth, it is easily adaptable to video processing.

The disclosed local-area contrast enhancement system is based on a model of vision called opponent contrast. In the human visual system (HVS), colour vision is primarily a result of sensitivity to light by cone cells. The incoming signal is contrast enhanced within a specific spatial frequency bands by opponent processing via cone cell interactions. Opponent processing is a key characteristic of the human visual system, especially for colour sensing, color constancy perception, and contrast. Other works have used this property of the human visual system for contrast based fusion between infrared and visible light imagery for military applications.

Figure 3:
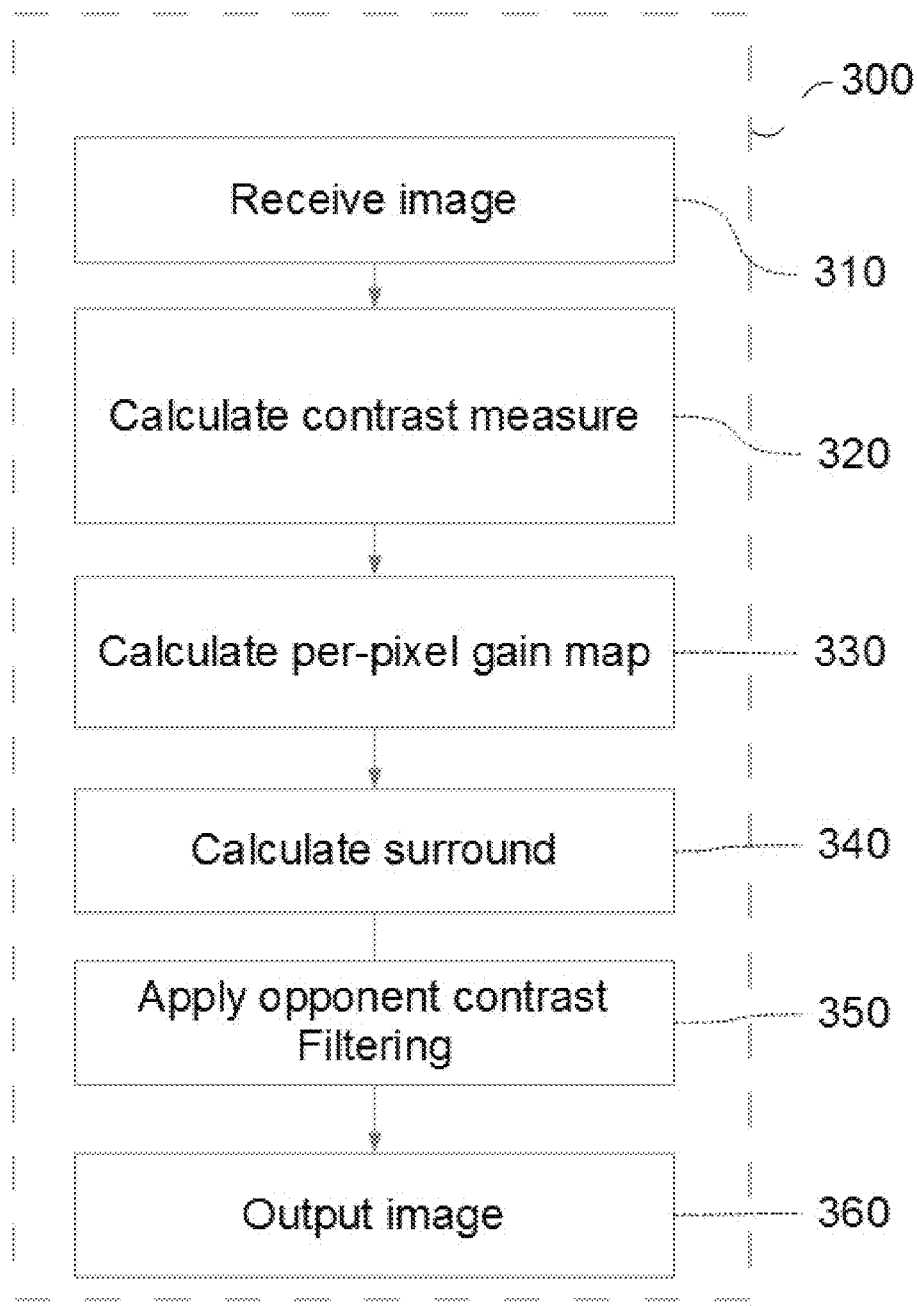
FIG. 3 is a flow diagram illustrating the core logic according to one embodiment of the present invention.

The system mimics the opponent contrast processing properties of the human visual system. By taking a bio-mimetic approach a perceptually realistic effect is achieved whilst structuring the processing in an easily parallelizable form. The algorithm is further refined to adapt automatically to incoming imagery. It does this by scaling gain on a per pixel basis (via an adaptive gain map) and on a per image basis by utilizing a contrast factor (or measure) that decreases the amount of enhancement based on how well exposed the image is to begin with. As depicted in FIG. 3, the system 300 can broadly be described to enhance contrast by:

receiving an image from a source device or system 310;
calculating a contrast measure of the input image 320;
calculating a per-pixel gain map 330;
calculating a surround 340;
applying opponent contrast filtering 350; and
saving the resulting image to memory 360.

At the core of the approach is the concept of opponent contrast based on a feed-forward center-surround non-linear shunting network. In this model, the central 'neuron', or cone, is excitatory, while the surrounding 'neurons' are inhibitory. In the case of image processing, the central pixel is treated as a neuron while a Gaussian filtered kernel of its surrounding pixels is treated as the surround. The change in 'current', or in this case pixel intensity, is given by:

$$\frac{dO}{dt} = -AO + (1-O) - (1+O)(h*I)$$

In the above equation, O is the output pixel, g is a gain factor, h is the Gaussian kernel convolved with the input image, I. This equation describes the dynamics of a charging neural membrane, or in other words, a capacitor. The shunting coefficients (1+/−0) describe potential differences across the 'membrane'. A describes the leakage current and can also be thought of as an attenuation factor. At equilibrium, this equation transforms to:

$$O = \frac{gI - h*I}{A + gI + h*I}$$

This initial version has several issues.

For example, a global gain and attenuation factor is not ideal as it leads to either blooming of highlights or under-enhancement of dark regions. The base approach can lead to unrealistic looking imagery, particularly on skin tones. Also, the parameters for each image have to be tuned by the user.

Receiving Image from Source Device or System

The disclosed system may receive the source image from any combination of one or more computer-readable medium (s). The computer-readable medium may be either a computer-readable signal medium or a computer-readable storage medium. The phrase "computer-readable storage medium" refers to non-transitory storage medium. Non-limiting examples of computer readable storage medium include an electronic, magnetic, optical, electromagnetic, infrared, or semiconductor system, apparatus, or device, or any suitable combination of the foregoing. Specific examples of computer readable storage mediums include: an electrical connection having one or more wires, a portable computer diskette, a hard disk drive, a solid state drive, random access memory, read only memory, erasable programmable read-only memory, an optical fiber, a portable compact disc, a digital versatile disc, optical storage device, magnetic storage device, or any suitable combination of the foregoing.

Calculating a Contrast Measure of the Input Image

Figure 4:
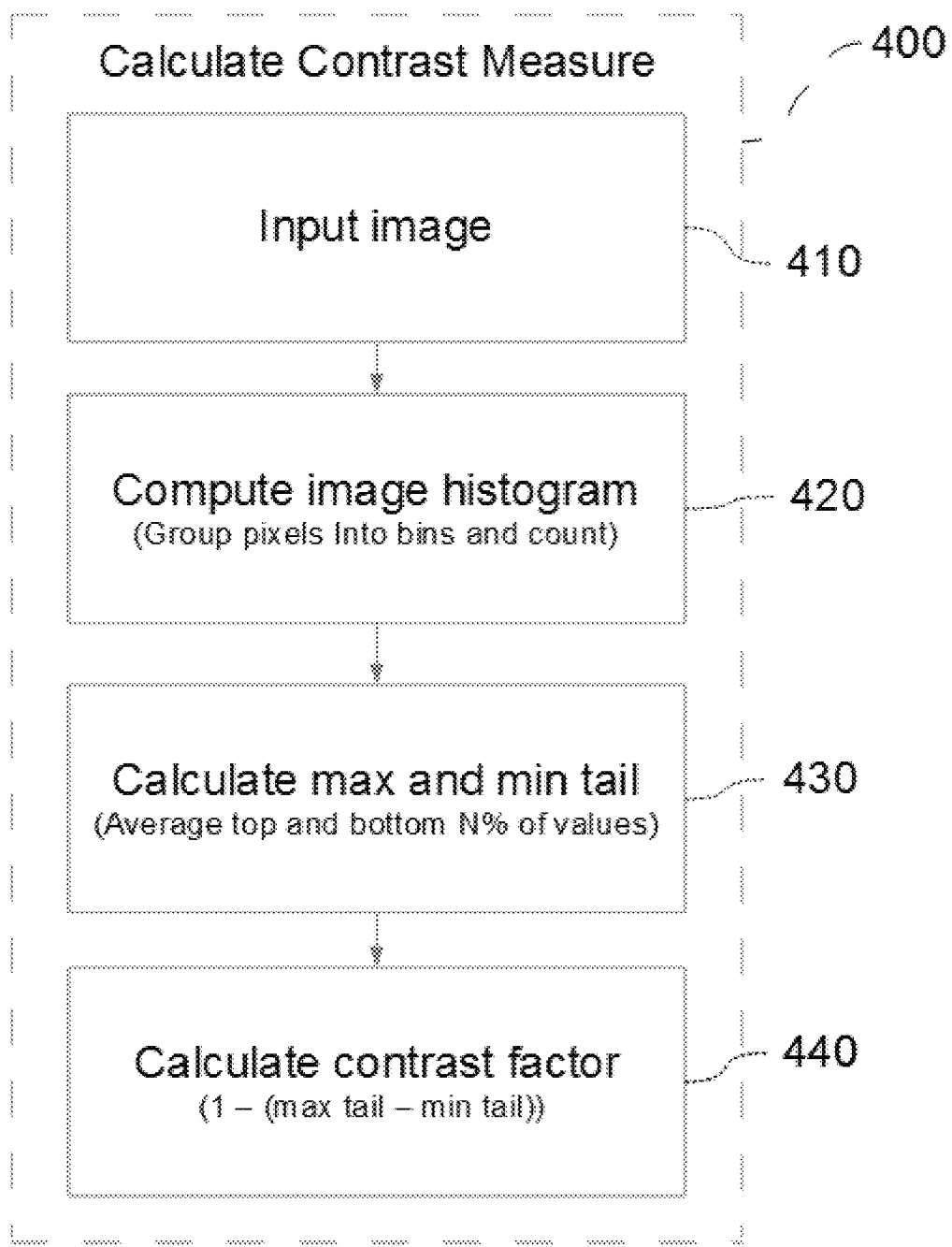
FIG. 4 is a flow diagram illustrating methods that may be used to calculate a contrast measure (or factor) according to another embodiment of the present invention.

A preferred method to calculate a contract measure of the input image 400 is depicted in FIG. 4. With input image received by the system 410, an image histogram is first computed 420. The image histogram is a flexible construct, it can be built for any type of colour space. It is N-dimensional with N representing the number of channels. For example, in the case of an RGB colour space, the number of channels is 3. The image histogram is produced by grouping the pixel values into bins and counting the number of pixels in each bin. For instance, an 8 bit image using the RGB colour space could be divided into $2^{(8+8+8)}$ bins such that each bin represents a unique pixel value in the RGB colour space.

Next, the contrast measure can be calculated. The contrast measure, also referred to as a contrast factor, is a number normalized from 0.0 to 1.0 that measures how well the input image is exposed. It is used to scale the gain based on the input image. This factor prevents well-exposed images from being over processed. The contrast measure is calculated based on the image histogram as:

$$CF = 1 - (\text{max tail} - \text{min tail})$$

Where max tail is the mean value of the top N percent of the image histogram and min tail is the mean value of the image histogram 430. The contrast factor is used to adapt to the input image. If the image is well exposed, max tail−min tail will approach 1 and the contrast factor will approach 0, resulting in minimal enhancement of the image. On the other hand, if the image is poorly exposed, the contrast factor will approach 1. Therefore, this calculation aids the algorithm in running automatically on input images without requiring user input. N may be any number between 0 and 100%, but is typically selected to be between 1% and 20% or more preferably between 3% and 10%.

Calculating a Per-Pixel Gain Map

Figure 5:
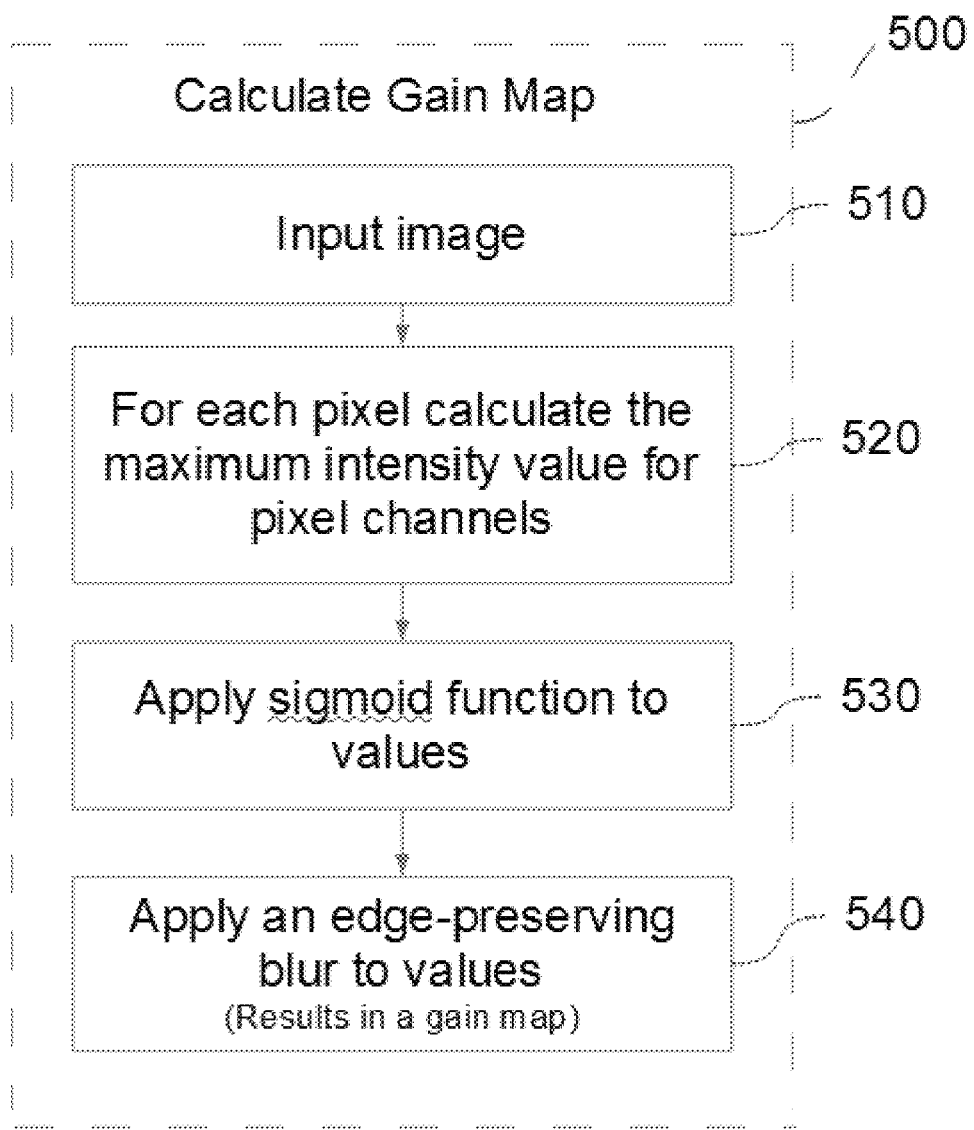
FIG. 5 is a flow diagram illustrating methods that may be used to create a per-pixel gain map according to a further embodiment of the present invention.

A preferred method to calculate a per-pixel gain map 500 is depicted in FIG. 5. A per-pixel gain and attenuation map is required in order to avoid blooming of highlights or under enhancement of dark regions in the image. To create a per-pixel gain map, the system proceeds as follows.

For each pixel in the input image 510, calculate the max of the R, G, and B channels 520.

Pass the pixel value through a sigmoid function 530, introducing a polynomial attenuation. This polynomial attenuation on the gain map is important for selectively enhancing regions of the image that require correction.

Apply an edge-preserving blur to the gain map 540. This spreads the gains in order to avoid local sharp changes in gain. An edge-preserving blur is required in order to avoid haloing and other edge artifacts around the object boundaries.

Figure 2:
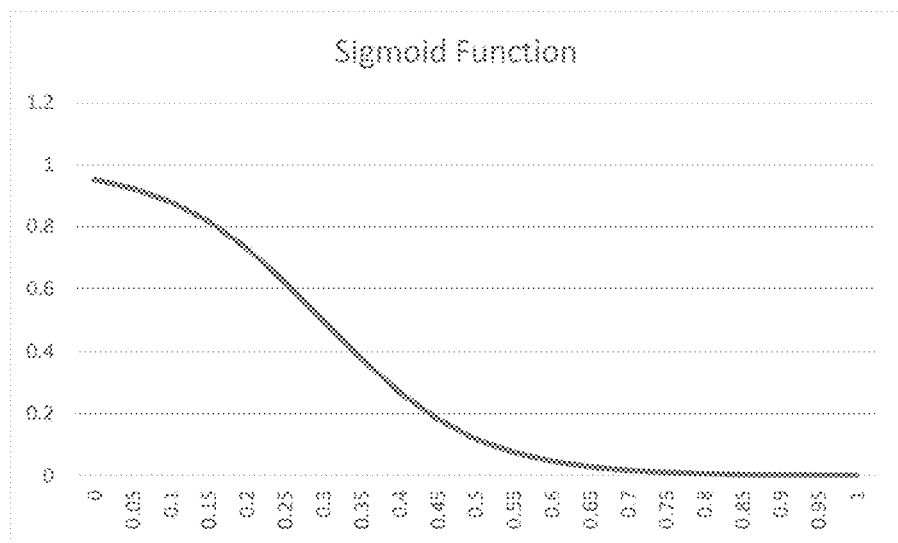
FIG. 2 illustrates the sigmoid function. This function is a mathematical function having an "S" shaped curve and is commonly used to model the activation function of artificial neurons. It is used in the gain map calculation since it has a sharp boost for shadows with a sharp drop-off for mid-tones and highlights.

The sigmoid function is calculated as:

$$O = \frac{1}{1 + e^{-10(1-I)+7}}$$

Where O is the output intensity value and I is the input intensity value. The curve is a slightly modified form of the sigmoid function (FIG. 2) which is a special case of the logistic function. It is used here as it has a characteristic "S" shaped curve. It is commonly used to model the activation function of artificial neurons. It is used in the gain map calculation since it has a sharp boost for shadows with a sharp drop-off for mid-tones and highlights. This accentuates the local area contrast gain while leaving a natural and pleasing appearance for mid-tones and highlights.

The edge preserving blur used by the disclosed system is a guided filter. A guided filter smoothes the image while preserving edges using the content of a second image (often referred to as a guidance image) to influence the filtering. The guidance image can be the image itself, a different version of the image, or a completely different image. Guided image filtering is a neighborhood operation, similar to other filtering operations, but takes into account the statistics of a region in the corresponding spatial neighborhood in the guidance image when calculating the value of the output pixel.

The primary purpose of the edge preserving blur is to effectively "mask" areas of the image based on their dominant gain value whilst leaving sharp edges between distinct regions in the image. This masking is important to prevent halos and bright objects around dark backgrounds.

Calculating a Surround

Figure 6:
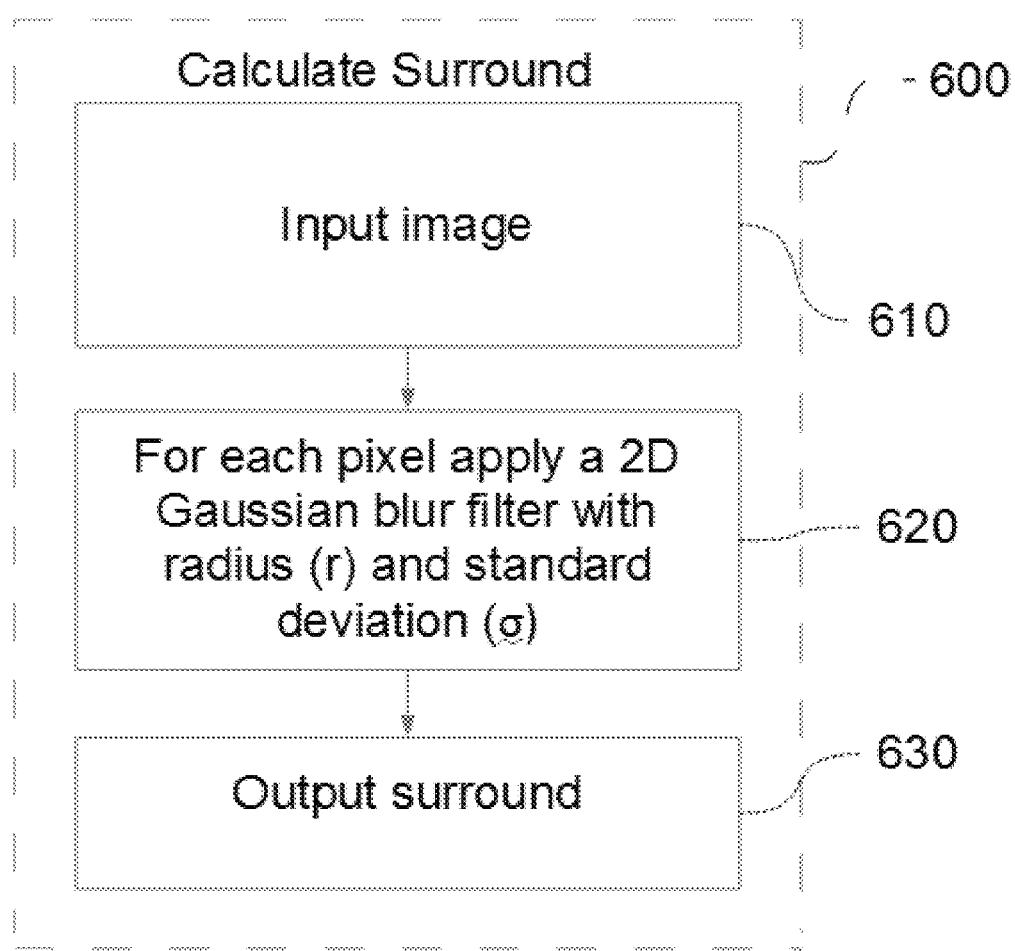
FIG. 6 is flow diagram depicting methods that may be used to create a surround according to an additional embodiment of the present invention.

A preferred method to calculate a surround 600 is depicted in FIG. 6. The surround is created by applying a 2D Gaussian blur filter with an adjustable radius and sigma 620 to the pixels surrounding the current pixel of the input image 610 being processed. This filter has a smoothing effect on the image. The surround is then saved for later use 630.

Applying Opponent Contrast Filtering

Figure 7:
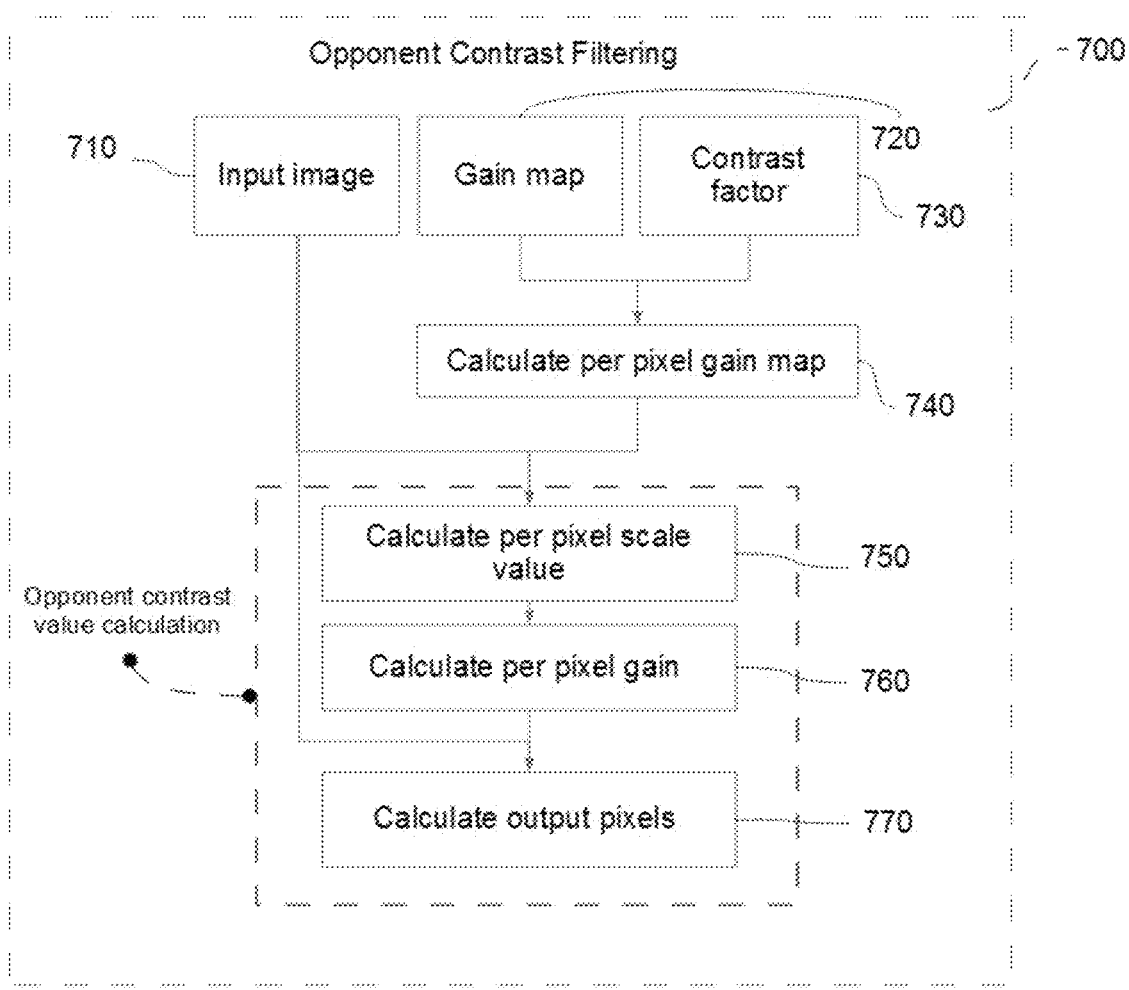
FIG. 7 is a flow diagram illustrating a method that may be used to for opponent contrast filtering based on an image and a previously calculated gain map and contrast factor.

A preferred method to perform opponent contrast filtering is depicted in FIG. 7. The contrast enhanced image is calculated based on the previously calculated inputs. First the per pixel gain ($g_{ij}$) 740 is calculated based on the calculated gain map ($G_{ij}$) 720 scaled by the contrast factor (CF) 730:

$$g_{ij} = G_{ij} * CF$$

Next, a mid-tone preservation step is applied in order to prevent mid-tones from being altered. Raising or lowering the overall level of mid-tones in the image was empirically found to lead to an un-pleasing visual appearance, especially with skin tones, but was also found to help with the appearance of natural scenery in general.

Finally, the opponent contrast value of the output pixel is calculated 740. The scale value 750 for each pixel ($s_{ij}$) is calculated based on the input pixel ($I_{ij}$) and the mid-tone scale (m) as:

$$s_{ij} = 0.25 - \frac{(I_{ij} - 0.5)^2}{m}$$

The per pixel gain ($\gamma_{ij}$) 760 is then calculated based on an attenuation factor (a), the per pixel gain ($g_{ij}$), the input pixel ($I_{ij}$), and the scale value ($s_{ij}$) as:

$$\gamma_{ij} = a + g_{ij} + (1-I_{ij}) + g(1-s_{ij})$$

The output pixel ($o_{ij}$) 770 is then determined based on the per pixel gain ($\gamma_{ij}$), the input pixel ($I_{ij}$), the Gaussian surround gain ($\beta$), the Gaussian blur kernel (h).

$$o_{ij} = \frac{\gamma_{ij} - \beta \gamma_{ij} h * I_{ij}}{a + \gamma_{ij} I_{ij} + \beta \gamma_{ij} h * I_{ij}}$$

where * is the convolution operator.

The enhanced image may then, for example, be stored in memory for later use, displayed or transmitted electronically over a network.

Generally, a computer, computer system, computing device, client or server, as will be well understood by a person skilled in the art, includes one or more than one computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

While some embodiments or aspects of the present disclosure may be implemented in fully functioning computers and computer systems, other embodiments or aspects may be capable of being distributed as a computing product in a variety of forms and may be capable of being applied regardless of the particular type of machine or computer readable media used to actually effect the distribution.

At least some aspects disclosed may be embodied, at least in part, in software. That is, some disclosed techniques and methods may be carried out in a computer system or other data processing system in response to its processor, such as a microprocessor, executing sequences of instructions contained in a memory, such as ROM, volatile RAM, non-volatile memory, cache or a remote storage device.

A non-transitory computer readable storage medium may be used to store software and data which when executed by a data processing system causes the system to perform various methods or techniques of the present disclosure. The executable software and data may be stored in various places including for example ROM, volatile RAM, non-volatile memory and/or cache. Portions of this software and/or data may be stored in any one of these storage devices.

Examples of computer-readable storage media may include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like. The storage medium may be the internet cloud, or a computer readable storage medium such as a disc.

Furthermore, at least some of the methods described herein may be capable of being distributed in a computer program product comprising a computer readable medium that bears computer usable instructions for execution by one or more processors, to perform aspects of the methods described. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

At least some of the elements of the systems described herein may be implemented by software, or a combination of software and hardware. For example, all the described processing functions may be implemented in software that runs on one or more programmable processors. Elements of the system that are implemented via software may be written in a high-level procedural language such as object oriented programming or a scripting language. Accordingly, the program code may be written in C, C++, J++, or any other suitable programming language and may comprise modules or classes, as is known to those skilled in object oriented programming. At least some of the elements of the system that are implemented via software may be written in assembly language, machine language or firmware as needed. In any case, the program code can be stored on storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific and predefined manner in order to perform at least one of the methods described herein.

While the teachings described herein are in conjunction with various embodiments for illustrative purposes, it is not intended that the teachings be limited to such embodiments. On the contrary, the teachings described and illustrated herein encompass various alternatives, modifications, and equivalents, without departing from the described embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

As used herein, the term "exemplary" or "example" means "serving as an example, instance, or illustration," and should not be construed as preferred or advantageous over other configurations disclosed herein.

As used herein, the terms "about", "approximately", and "substantially" are meant to cover variations that may exist in the upper and lower limits of the ranges of values, such as variations in properties, parameters, and dimensions. In one non-limiting example, the terms "about", "approximately", and "substantially" may be understood to mean plus or minus 10 percent or less.

Unless defined otherwise, all technical and scientific terms used herein are intended to have the same meaning as commonly understood by one of ordinary skill in the art.

The scope of the claims that follow is not limited by the embodiments set forth in the description. The claims should be given the broadest purposive construction consistent with the description and figures as a whole.

What is claimed is:

1. An improvement to an image processing system, the image processing system comprising a computer processor and a memory containing a digital image comprising a plurality of image pixels, the computer processor being configured to process the digital image, the improvement comprising configuring the computer processor to perform a local-area contrast enhancement of the digital image by:
   determining a contrast factor of the digital image, the contrast factor being a measure of how well exposed the digital image is based on a normalized intensity value for each of the image pixels;
   determining a gain value for each of the image pixels in the digital image;
   scaling the gain value of each of the image pixels by the contrast factor;
   calculating a surround image based on a filtered version of the digital image;
   applying opponent contrast filtering to the digital image to produce an output image comprising output pixels, wherein the opponent contrast filtering is based on the scaled gain values and the surround image; and
   storing the output image in the memory;

wherein each image pixel, I, and output pixel, O, comprises one or more than one component values, $I_i$ and $O_i$ respectively, where i indexes the components, and, for each of the image pixels, $O_i$ is calculated as $X_i/Y_i$, where $X_i$ is [the scaled gain value of the image pixel multiplied by $I_i$] less [the i'th component value of the corresponding pixel in the surround image] and $Y_i$ is the sum of (a) an attenuation factor, (b) the scaled gain value of the image pixel multiplied by $I_i$ and (c) the i'th component value of the corresponding pixel in the surround image.

2. The improvement of claim 1, wherein the surround image is produced by applying a Gaussian filter to the digital image.

3. The improvement of claim 1, wherein the attenuation factor is 0.

4. The improvement of claim 1 wherein the number of component values for each pixel is 3, and, for image pixel I, $l_1$ is a red value, $I_2$ is a green value and $I_3$ is a blue value.

5. The improvement of claim 1, wherein the contrast factor is calculated by:
- calculating the normalized intensity value for each of the image pixels, each normalized intensity value being a number in the range of 0 to 1;
- identifying a first cut-off value as the intensity value with N % of the intensity values of the image pixels being greater than or equal to the max tail value, and (100-N) % of the intensity values of the image pixels being less than the first cut-off value, wherein N is a number between 1 and 20;
- calculating a max tail value as the mean value of all the pixels with intensity values greater than or equal to the first cut-off value;
- identifying a second cut-off value as the intensity value with (100-N) % of the intensity values of the image pixels being greater than or equal to the min tail value, and N % of the intensity values of the image pixels being less than the min tail value;
- calculating a min tail value as the mean value of all the pixels with intensity values less than the second cut-off value;
- calculating the contrast factor as 1−(max tail value−min tail value).

6. The improvement of claim 1, wherein each image pixel comprises a red value, a green value and a blue value, each normalized to values in the range of 0 to 1, and the normalized intensity value of each pixel is the maximum of the normalized red, green and blue values of the image pixel.

7. The improvement of claim 1, wherein the gain values of the image pixels are calculated by:
- producing a provisional gain map by, for each image pixel, applying a sigmoid function to the normalized intensity value of the image pixel to calculate a provisional gain value of the provisional gain map; and
- applying an edge preserving blur filter to the provisional gain map to produce an image gain map having gain values corresponding to the image pixels,
- wherein the gain value of each of the image pixels is the gain value in the image gain map corresponding to the image pixel.

8. The improvement of claim 7, wherein the sigmoid function is applied to each input image pixel value I to compute $$O = \frac{1}{1+e^{-10(1-I)+7}}.$$

9. The improvement of claim 1, wherein each output pixel value, O, corresponding to an input image pixel with value I, is calculated as $$O = \frac{gI-s}{A+gI+s}$$

where g is the scaled gain value for the input image pixel, s is the pixel value in the surround image corresponding to the input image pixel, and A is an attenuation factor.

10. The improvement of claim 1 further comprising configuring the computer processor to apply a mid-tone preservation step to adjust the scaled gain values before applying opponent contrast filtering to the digital image.

11. The improvement of claim 10, wherein the mid-tone preservation step retains the ratios of the input tri-chromatic values and optionally adjusts the output chroma.

12. An image processing system for perform local-area contrast enhancement of digital images, the image processing system comprising:
- a memory for storing digital images, each digital image comprising a plurality of image pixels;
- a computer processor in digital communication with the memory, the computer processor being configured to:
  - retrieve one of the digital images from the memory;
  - determine a gain value for each of the image pixels in the digital image;
  - calculate a surround image based on a filtered version of the digital image;
  - apply opponent contrast filtering to the digital image to produce an output image comprising output pixels, wherein the opponent contrast filtering is based on the gain values and the surround image; and
  - store the output image in the memory;
- wherein each image pixel, I, and output pixel, O, comprises one or more than one component values, $I_i$ and $O_i$ respectively, where i indexes the components, and, for each of the image pixels, $O^i$ is calculated as $X_i/Y_i$, where $X_i$ is [the scaled gain value of the image pixel multiplied by $I_i$] less [the i'th component value of the corresponding pixel in the surround image] and $Y_i$ is the sum of (a) an attenuation factor, (b) the scaled gain value of the image pixel multiplied by $I^i$, and (c) the i'th component value of the corresponding pixel in the surround image.

13. The image processing system of claim 12, wherein the surround image is produced by applying a Gaussian filter to the digital image.

14. A method to perform a local-area contrast enhancement of a digital image by a computer processor, the method comprising the steps of:
- determining a contrast factor of the digital image, the contrast factor being a measure of how well exposed the digital image is based on a normalized intensity value for each of the image pixels;
- determining a gain value for each of the image pixels in the digital image;
- scaling the gain value of each of the image pixels by the contrast factor;
- calculating a surround image based on a filtered version of the digital image;
- applying opponent contrast filtering to the digital image to produce an output image comprising output pixels, wherein the opponent contrast filtering is based on the scaled gain values and the surround image;

storing the output image in a memory;

producing a provisional gain map by, for each image pixel, applying a sigmoid function to the normalized intensity value of the image pixel to calculate a provisional gain value of the provisional gain map; and applying an edge preserving blur filter to the provisional gain map to produce an image gain map having gain values corresponding to the image pixels, wherein the gain value of each of the image pixels is the gain value in the image gain map corresponding to the image pixel.

15. The method of claim 14, wherein the surround image is produced by applying a Gaussian filter to the digital image.

16. The method of claim 14 further comprising a mid-tone preservation step to adjust the scaled gain values before applying opponent contrast filtering to the digital image.

17. The method of claim 14 wherein each output pixel value, O, corresponding to an input image pixel with value I, is calculated as $$O = \frac{gI - s}{A + gI + s}$$

where g is the scaled gain value for the input image pixel, s is the pixel value in the surround image corresponding to the input image pixel, and A is an attenuation factor.

* * * * *